US012203639B1

(12) United States Patent
Alexander et al.

(10) Patent No.: US 12,203,639 B1
(45) Date of Patent: Jan. 21, 2025

(54) LUMINAIRES HAVING A WIRELESS ANTENNA

(71) Applicant: CSC Holdings, LLC, Bethpage, NY (US)

(72) Inventors: Michael Alexander, W. Hempstead, NY (US); Robert Anderson, Levittown, NY (US); Alvin Clark, Bethpage, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 18/499,835

(22) Filed: Nov. 1, 2023

Related U.S. Application Data

(63) Continuation of application No. 18/152,695, filed on Jan. 10, 2023, now Pat. No. 11,852,329, which is a continuation of application No. 17/671,047, filed on Feb. 14, 2022, now Pat. No. 11,549,676, which is a continuation of application No. 17/329,910, filed on May 25, 2021, now Pat. No. 11,248,781, which is a continuation of application No. 16/434,297, filed on Jun. 7, 2019, now Pat. No. 11,015,792, which is a continuation of application No. 15/650,113, filed on Jul. 14, 2017, now Pat. No. 10,337,714, which is a continuation of application No. 14/496,537, filed on Sep. 25, 2014, now Pat. No. 9,726,360.

(51) Int. Cl.

| | |
|---|---|
| ***F21V 23/04*** | (2006.01) |
| ***F21S 8/08*** | (2006.01) |
| ***F21V 7/00*** | (2006.01) |
| ***F21W 131/103*** | (2006.01) |
| ***F21Y 115/10*** | (2016.01) |

(52) U.S. Cl.
CPC .......... *F21V 23/0435* (2013.01); *F21S 8/088* (2013.01); *F21V 7/0025* (2013.01); *F21V 23/045* (2013.01); *F21W 2131/103* (2013.01); *F21Y 2115/10* (2016.08)

(58) Field of Classification Search
CPC ...... F21V 23/06; F21V 7/0025; F21V 7/0066; F21V 7/041; F21V 7/05; F21K 9/64; F21S 8/088; H01G 1/44; H01G 19/185; H01G 21/205
See application file for complete search history.

(56) References Cited

U.S. PATENT DOCUMENTS

| | | | |
|---|---|---|---|
| 5,605,506 | A | 2/1997 | Hoorn et al. |
| 5,795,051 | A | 8/1998 | Galanski |
| 6,120,262 | A | 9/2000 | McDonough et al. |

(Continued)

*Primary Examiner* — Bryon T Gyllstrom
(74) *Attorney, Agent, or Firm* — Sterne, Kessler, Goldstein & Fox P.L.L.C.

(57) ABSTRACT

A luminaire includes a housing defining an interior volume. The luminaire also includes a lamp within the interior volume and configured to emit light. Additionally, the luminaire includes a wireless antenna positioned within the interior volume, configured to transmit or receive a wireless signal along a first direction, and configured to be operatively coupled to an access point. The wireless antenna can be entirely within the interior volume. The luminaire can include a first reflective surface within the interior volume and configured to redirect the wireless signal. The lamp can be configured to be electrically coupled to a power inserter that powers the access point.

20 Claims, 10 Drawing Sheets

(56) References Cited

U.S. PATENT DOCUMENTS

| | | | | |
|---|---|---|---|---|
| 6,222,503 | B1 * | 4/2001 | Gietema | H01Q 1/44 343/890 |
| 6,624,845 | B2 * | 9/2003 | Loyd | F21V 33/0052 348/E7.087 |
| 6,888,315 | B1 * | 5/2005 | Hsiao | H04W 88/08 315/56 |
| 7,614,771 | B2 | 11/2009 | McKechnie et al. | |
| 7,736,033 | B2 | 6/2010 | Patel | |
| 8,214,061 | B2 | 7/2012 | Westrick, Jr et al. | |
| 8,820,981 | B2 * | 9/2014 | Jonsson | H01J 61/025 362/346 |
| 8,847,491 | B2 | 9/2014 | Yotsumoto et al. | |
| 9,267,653 | B2 | 2/2016 | Benner | |
| 9,726,360 | B1 | 8/2017 | Alexander et al. | |
| 10,337,714 | B1 | 7/2019 | Alexander et al. | |
| 11,015,792 | B1 | 5/2021 | Alexander et al. | |
| 11,248,781 | B1 | 2/2022 | Alexander et al. | |
| 11,549,676 | B1 | 1/2023 | Alexander et al. | |
| 2001/0040805 | A1 | 11/2001 | Lansing et al. | |
| 2003/0053307 | A1 | 3/2003 | Talamo et al. | |
| 2004/0012344 | A1 | 1/2004 | Bibi | |
| 2004/0057235 | A1 | 3/2004 | Li | |
| 2004/0109322 | A1 | 6/2004 | Desanto et al. | |
| 2005/0036323 | A1 * | 2/2005 | Baken | H01Q 1/1207 362/382 |
| 2005/0128750 | A1 | 6/2005 | Choi et al. | |
| 2005/0185398 | A1 | 8/2005 | Scannell, Jr. | |
| 2005/0265035 | A1 | 12/2005 | Brass et al. | |
| 2007/0285912 | A1 * | 12/2007 | Lin | H01Q 1/06 362/4 |
| 2008/0170403 | A1 | 7/2008 | Gurevich | |
| 2008/0174456 | A1 * | 7/2008 | Warren | G09F 15/0037 362/183 |
| 2008/0212319 | A1 | 9/2008 | Klipstein | |
| 2009/0040750 | A1 | 2/2009 | Myer | |
| 2010/0188301 | A1 | 7/2010 | Kishimoto et al. | |
| 2010/0283605 | A1 | 11/2010 | Nevins | |
| 2010/0327766 | A1 | 12/2010 | Recker et al. | |
| 2011/0060701 | A1 | 3/2011 | Verfuerth et al. | |
| 2012/0020060 | A1 | 1/2012 | Myer et al. | |
| 2015/0002305 | A1 | 1/2015 | Wells | |
| 2015/0049461 | A1 | 2/2015 | Yutsumoto et al. | |
| 2015/0276192 | A1 | 10/2015 | Kafry et al. | |
| 2015/0377479 | A1 * | 12/2015 | Pescod | H01Q 1/22 362/85 |
| 2016/0041324 | A1 | 2/2016 | Nava et al. | |
| 2016/0047537 | A1 | 2/2016 | Stolte et al. | |
| 2016/0091187 | A1 | 3/2016 | Roehler et al. | |
| 2016/0186972 | A1 | 6/2016 | Stolte et al. | |
| 2022/0020060 | A1 | 1/2022 | Tumuluru | |

* cited by examiner

LUMINAIRES HAVING A WIRELESS ANTENNA

CROSS-REFERENCE TO RELATED APPLICATION

This application is a continuation of U.S. application Ser. No. 18/152,695, filed Jan. 10, 2023, which is a continuation of U.S. application Ser. No. 17/671,047, filed Feb. 14, 2022, which issued as U.S. Pat. No. 11,549,676 on Jan. 10, 2023, which is a continuation of U.S. application Ser. No. 17/329,910, filed May 25, 2021, which issued as U.S. Pat. No. 11,248,781 on Feb. 15, 2022, which is a continuation of U.S. application Ser. No. 16/434,297, filed Jun. 7, 2019, which issued as U.S. Pat. No. 11,015,792 on May 25, 2021, which is a continuation of U.S. application Ser. No. 15/650,113, filed Jul. 14, 2017, which issued as U.S. Pat. No. 10,337,714 B1 on Jul. 2, 2019, which is a continuation of U.S. application Ser. No. 14/496,537, filed Sep. 25, 2014, which issued as U.S. Pat. No. 9,726,360 B1 on Aug. 8, 2017, all of which are incorporated herein by reference in their entireties.

BACKGROUND

Field

The present invention is generally related to wireless networks and more specifically to luminaires having a wireless antenna.

Background

People are increasingly relying on network connectivity. For example, people rely on network connectivity to provide access email, the Internet, mobile applications, centralized databases, and information management systems. Accordingly, indoor and outdoor wireless networks are becoming increasingly important. But often the desired location, for example, parks, streets, buildings, and outdoor venues, in which these wireless networks are installed, require that the network equipment, for example, a wireless antenna, be concealed for aesthetic purposes. Accordingly, there is a need for devices and methods that conceal network equipment without compromising the functionality of the network equipment.

BRIEF SUMMARY

In some embodiments, a luminaire includes a housing defining an interior volume. The luminaire includes a lamp within the interior volume. The lamp is configured to emit light. The luminaire also includes a first wireless antenna positioned within the interior volume. The first wireless antenna is configured to transmit or receive a wireless signal along a first direction and to be operatively coupled to an access point. In some embodiments, the first direction is downward towards the ground.

In some embodiments, the first wireless antenna is positioned entirely within the interior volume.

In some embodiments, the luminaire includes a first reflective surface positioned within the interior volume and configured to redirect the wireless signal along the first direction. The luminaire can also include a second reflective surface positioned within the interior volume. The second reflective surface can be configured to redirect a first light ray emitted from the lamp in a second direction. The luminaire can also include a third reflective surface positioned within the interior volume. The third reflective surface can be configured to redirect a second light ray emitted from the lamp in a third direction different than the second direction. The second reflective surface and the third reflective surface can form a V shape in some embodiments. The second reflective surface is between the lamp and the first reflective surface in some embodiments. In some embodiments, the second reflective surface is between the lamp and the first wireless antenna. The second reflective surface can be planar and angled downward toward the ground from an inner side to an outer side.

The second reflective surface can be coupled to a first side of the housing. The lamp can also be coupled to the first side of the housing. The first side of the housing can be a top side. In some embodiments, the first wireless antenna is coupled to a second side of the housing opposite the first side of the housing. In some embodiments, the second side of the housing is a bottom side. In some embodiments, the first wireless antenna is coupled to the first side of the housing.

In some embodiments, the first wireless antenna is configured to transmit or receive a wireless signal along a third direction, and the first reflective surface is configured to redirect the wireless signal along the third direction.

The first reflective surface can be conical in some embodiments. The first reflective surface and the first wireless antenna can be coaxial.

The luminaire can also include a second wireless antenna positioned within the interior volume and configured to transmit or receive a second wireless signal along a second direction different than the first direction, and a third wireless antenna positioned within the interior volume and configured to transmit or receive a third wireless signal along a third direction different than the first direction and the second direction. The second wireless antenna and the third wireless antenna can be positioned entirely within the interior volume.

In some embodiments, the first wireless antenna is configured to be operatively coupled to an access point positioned outside the interior volume. In some embodiments, the first wireless antenna is configured to be operatively coupled to an access point positioned in an enclosure on the ground.

In some embodiments, the first wireless antenna is configured to be operatively coupled to an access point positioned inside the interior volume.

In some embodiments, the first wireless antenna is a directional antenna, an omnidirectional antenna, or a dipole antenna.

The lamp can be an LED lamp. In some embodiments, the LED lamp is configured to be electrically coupled to a power inserter that powers the access point.

Further features and advantages, as well as the structure and operation of various embodiments, are described in detail below with reference to the accompanying drawings. It is noted that the embodiments of the invention are not limited to the specific embodiments described herein. Such described embodiments are presented herein for illustrative purposes only. Additional embodiments will be apparent to persons skilled in the relevant art(s) based on the teachings contained herein.

BRIEF DESCRIPTION OF THE DRAWINGS

Embodiments will now be described, by way of example only, with reference to the accompanying schematic drawings in which.

Figure 1:
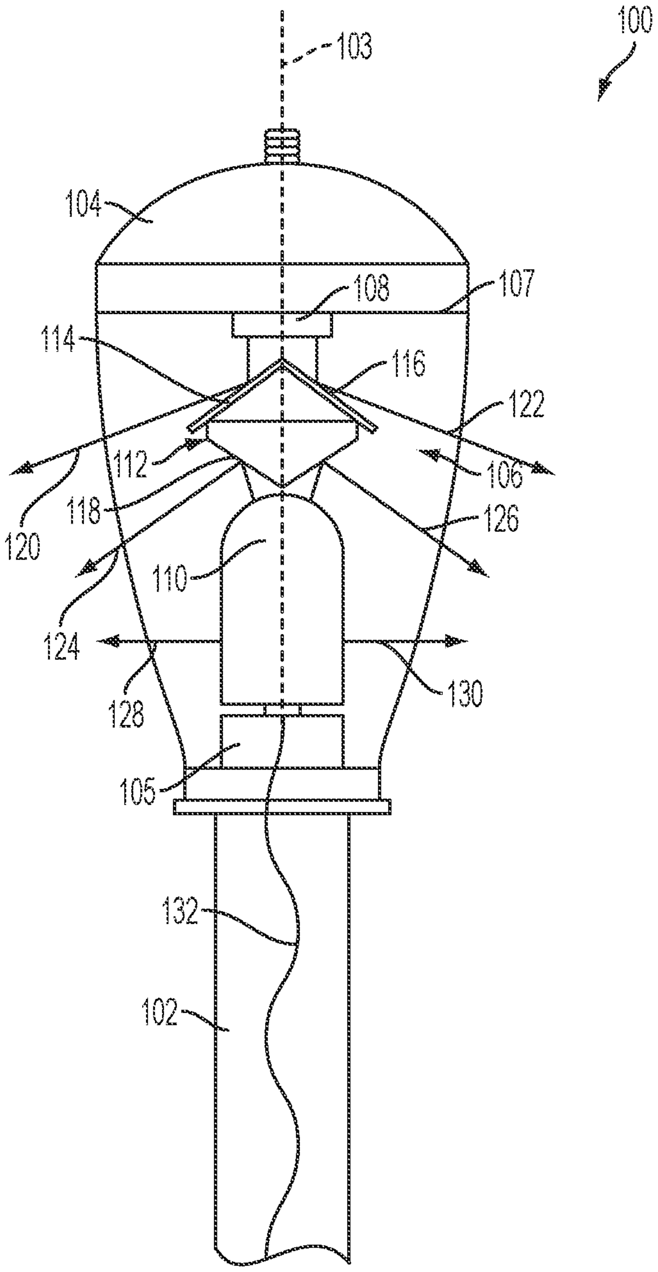
FIG. 1 illustrates a side view of a luminaire according to an embodiment.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The embodiments described, and references in the specification to "one embodiment," "an embodiment," "an example embodiment," "an example," "some embodiments," etc., indicate that the embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

In this application, "luminaire" refers generally to a lighting unit primarily for providing light for illumination purposes and that includes a lamp and a ballast (when applicable) together with any parts designed to distribute the light, to position and protect the lamp, and to connect the lamp to the power supply.

Referring generally to the below description and accompanying figures, luminaires that include a housing, a lamp, and a wireless antenna positioned within the housing to conceal the antenna from the view of people in the vicinity of the luminaire without compromising the functionality of the wireless antenna are disclosed.

FIG. 1 illustrates a luminaire 100 according to an embodiment. Luminaire 100 includes a housing 104 that defines an interior volume 106 of luminaire 100. Luminaire 100 also includes a lamp 108 positioned within interior volume 106. Lamp 108 is configured to emit light. Luminaire 100 also includes a first wireless antenna 110 positioned within the interior volume. First wireless antenna 110 is configured to transmit or receive a wireless signal along a first direction. First wireless antenna 110 is also configured to be operatively coupled to an access point (not shown in FIG. 1) that is part of a wireless network, for example, a wireless local area network (WLAN). The access point wirelessly couples a compatible computational device, for example, a computer, a game console, a mobile phone, an MP3 player, a personal digital assistant (PDA), or any other suitable computational device, to the network. In some embodiments, the access point is one of a plurality of access points that compose, at least in part, the network. In some embodiments, the access point is a WiFi access point that is compatible with the 802.11 WLAN specification. The access point can be either single or dual band.

Figure 10:
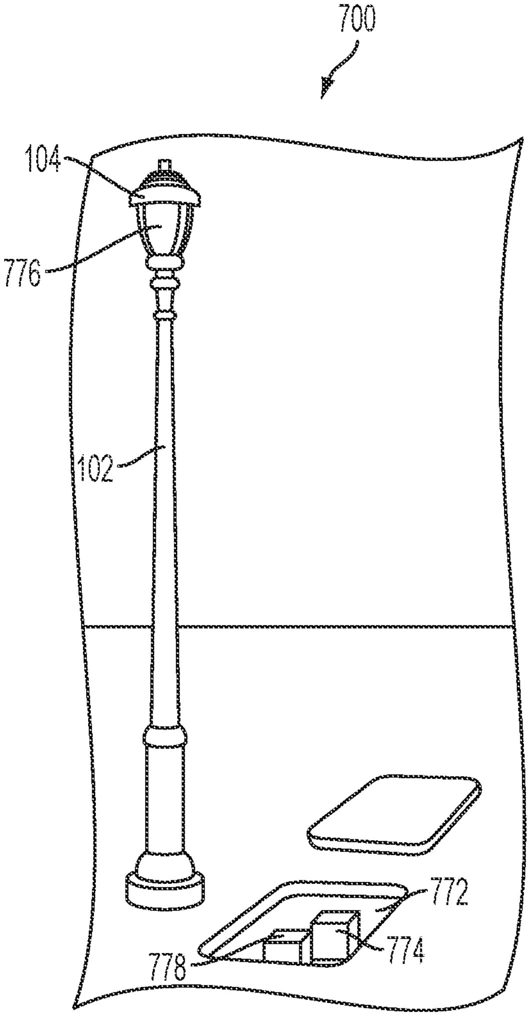
FIG. 10 illustrates a perspective view of a luminaire and a ground enclosure containing an access point according to an embodiment.

In some embodiments, luminaire 100 is configured for outdoor use. For example, luminaire 100 can be configured for roadway or street lighting, area or pathway lighting, flood lighting, tunnel lighting, or any other outdoor lighting application where network connectivity is also desired. As shown in FIG. 1, luminaire 100 can be an outdoor post-top luminaire configured to be mounted to a top of a post 102. In some embodiments, luminaire 100 is integral or separate from post 102. In some embodiments, post 102 extends from the ground as shown in FIG. 10. In some embodiments, luminaire 100 is configured to light an outdoor area to enhance the safety of people in the vicinity of the luminaire, to maintain the aesthetics of the outdoor area, to provide the illuminance to an outdoor area within a ten foot radius that is at least twice that of the adjacent area, or any combination thereof.

In some embodiments, luminaire 100 is configured for indoor use. For example, luminaire 100 can be used for residential lighting, retail lighting, office lighting, industrial lighting, warehouse lighting, or any other indoor lighting application where network connectivity is desired.

Luminaire 100 includes housing 104. Housing 104 is configured to protect and/or support one or more components of luminaire 100. Housing 104 can have a first side 105, for example, a bottom side, and an opposing second side 107, for example, a top side.

Housing 104 can be configured to protect and support lamp 108 and wireless antenna 110. Housing 104 defines an interior volume 106 configured to receive lamp 108 and wireless antenna 110. In some embodiments, interior volume 106 is at least 60 $in^3$. This volume can accommodate a wireless antenna usable over a reasonable area, and a lamp with brightness reasonable for illumination purposes. Volume 106 may be sufficiently large to accommodate the largest light sources, such as stadium lights or spotlights. In some embodiments, volume 106 will be not more than 20,000 $in^3$. Preferably, interior volume 106 ranges from 1,000 $in^3$ to 12,000 $in^3$, which should encompass most streetlights and similar light sources. Interior volume 106 can have any suitable shape. For example, as shown in FIG. 1, interior volume 106 can have a cylindrical shape. In other embodiments, luminaire 100 can have other suitable non-cylindrical shapes, for example, spherical shapes, conical shapes, triangular shapes, or any other suitable shapes.

In some outdoor embodiments, housing 104 can be configured to be mounted to a top of a post (as shown in FIG. 1), a laterally extending arm, a wall or surface, or any other desired outdoor attachment location.

Interior volume 106 is bounded by at least one surface that allows both light rays emitted from lamp 108 and a wireless signal transmitted to or from wireless antenna 110 to pass between interior volume 106 and the atmosphere surrounding housing 104. In some embodiments, this surface is defined by a portion of housing 104. In such embodiments, housing 104 can include a transparent or translucent surface that allows light and wireless signals to pass. In some embodiments, the transparent or translucent surface is a transparent or translucent glass, plastic, metal mesh, or any other suitable material.

In some embodiments, the surface that allows both light rays emitted from lamp 108 and a wireless signal transmitted to or from wireless antenna 110 to pass between interior volume 106 and the atmosphere surrounding housing 104 is simply an opening of interior volume 106 at the atmosphere surrounding housing 104 and defined by housing 104. The opening is defined by the imaginary surface that imitates the shape that would be obtained by attaching a plastic wrap to the edges of housing 104 with a zero pressure difference between interior volume 106 and the atmosphere surrounding housing 104.

In some embodiments, the at least one surface that bounds interior volume 106 and that allows light emitted from lamp 108 and a wireless signal transmitted to or from wireless antenna 110 to pass surrounds substantially the entire perimeter of housing 104, for example, at least 70 percent of the perimeter. In some embodiments, the at least one surface that bounds interior volume 106 and that allows light emitted from lamp 108 and a wireless signal transmitted to or from wireless antenna 110 to pass surrounds less than substantially the entire perimeter of housing 104, for example, less than 70 percent of the perimeter.

Luminaire 100 includes lamp 108 positioned within interior volume 106 of housing 104. In some embodiments, lamp 108 is positioned entirely within interior volume 106. In some embodiments, lamp 108 is positioned partially within interior volume 106.

Lamp 108 is a device that generates artificial light. For example, lamp 108 can be a filament lamp (e.g., incandescent, halogen, or halogen-IR), a discharge lamp (e.g., fluorescent or high intensity discharge), a light emitting diode (LED) lamp, or any other lamp suitable for a particular use of the luminaire.

In some embodiments, lamp 108 emits a plurality of light rays along one or more directions. For example, as illustrated in FIG. 1, lamp 108 emits light rays 120 and 122 in first and second downward directions toward a reflector assembly 112 (which is described further below).

In some embodiments as shown in FIG. 1, lamp 108 is coupled to second side 107 of housing 104.

In some embodiments, luminaire 100 includes a ballast, for example, a magnetic ballast, configured to start and to properly control the flow of current to lamp 108.

Luminaire 100 includes first wireless antenna 110 positioned within interior volume 106 of housing 104. In some embodiments, wireless antenna 110 is positioned entirely within interior volume 106. In such embodiments, wireless antenna 110 is concealed from the view of people in the vicinity of luminaire 110 while not compromising the functionality of wireless antenna 110 because a wireless signal transmitted to or from wireless antenna 110 passes between interior volume 106 and the atmosphere surrounding housing 104.

In some embodiments, wireless antenna 110 is positioned partially within interior volume 106.

Wireless antenna 110 is configured to be operatively coupled to an access point (not shown in FIG. 1), for example, by one or more cables 132. In some embodiments, cables 132 have a length that allows cables 132 to be coupled to an access point outside of interior volume 106, for example, in an enclosure on the ground. In such embodiments, cables 132 can run from housing 104, through post 102, and to an access point in the enclosure.

Depending on the application, antenna 110 can be omnidirectional, dipole, or directional, and can be a single or dual band antenna. As shown in FIG. 1, antenna 110 is an omnidirectional antenna configured to receive or transmit wireless signals along a plurality of directions. For example, as illustrated in FIG. 1, antenna 110 can receive or transmit wireless signals along first, second, third, and fourth directions 124, 126, 128, and 130. Wireless antenna 110 can receive or transmit wireless signals along radially outward directions (e.g., third and fourth directions 128 and 130) and along upward directions (e.g., first and second directions 124 and 126). In some embodiments as shown in FIG. 1, wireless antenna 110 is mounted within interior volume 106 such that at least one direction (here, directions 124 and 126) are directed toward reflector assembly 112 (described further below).

In some embodiments as shown in FIG. 1, wireless antenna 110 is coupled to first side 105 of housing 104, which is opposite from second side 107 to which lamp 108 is mounted.

In some embodiments as shown in FIG. 1, luminaire 100 also includes a reflector assembly 112 configured to redirect wireless signals transmitted from or to wireless antenna 110, and/or redirect light rays emitted from lamp 108. Reflector assembly 112 is positioned within interior volume 106. In some embodiments, reflector assembly 112 is positioned entirely within interior volume 106. In other embodiments, reflector assembly 112 is positioned partially within interior volume 106.

In some embodiments, reflector assembly 112 is positioned between lamp 108 and wireless antenna 110. In some embodiments when reflector assembly 112 is positioned between lamp 108 and wireless antenna 110, reflector assembly 112 is configured to shield wireless antenna 110 from heat generated by lamp 108. In some embodiments, reflector assembly 112 is configured to be a heat sink to dissipate heat generated by lamp 108.

Figure 2:
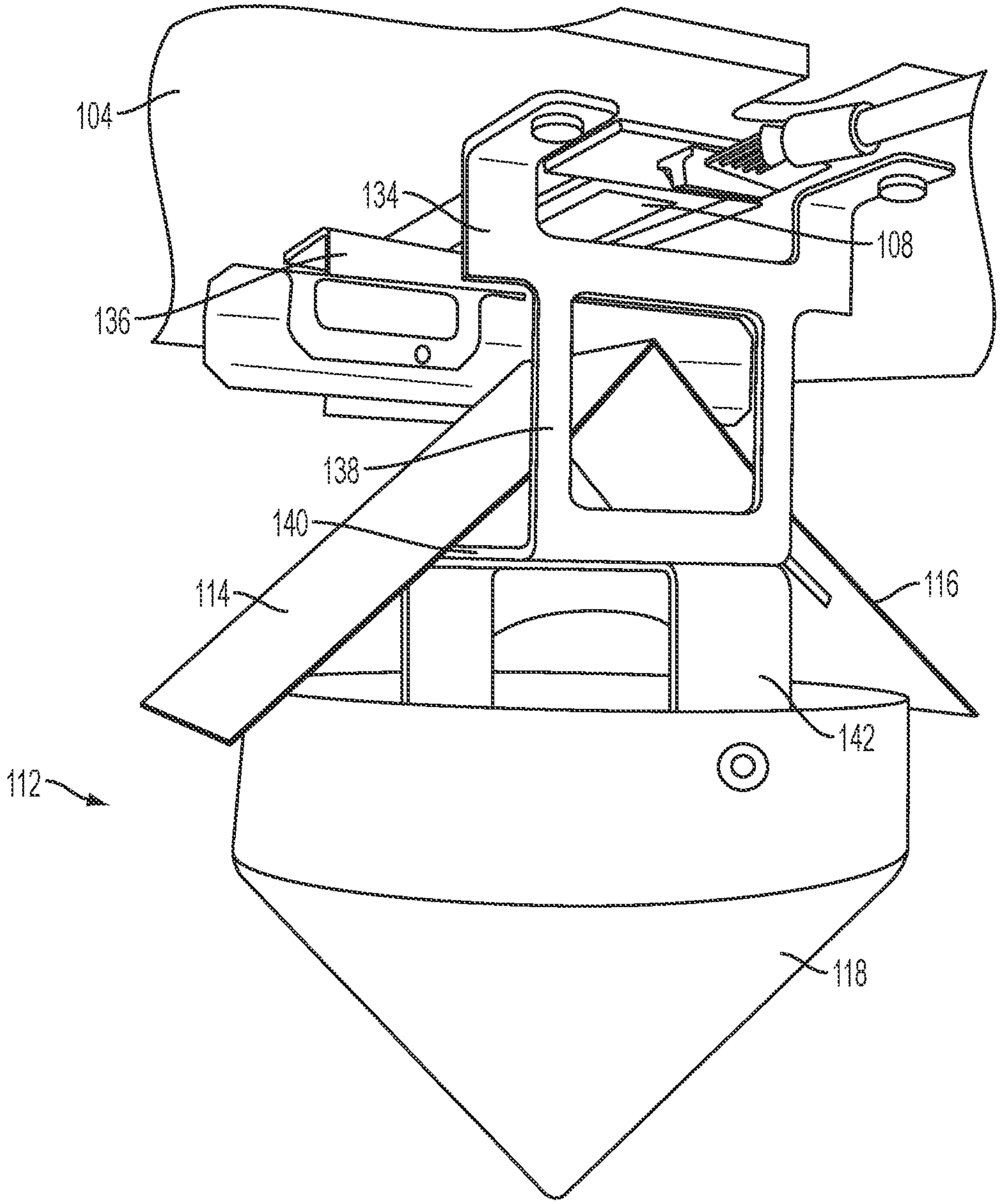
FIG. 2 illustrates a perspective view of a reflector assembly of the luminaire in FIG. 1 according to an embodiment.

FIG. 2 illustrates a perspective view of reflector assembly 112 according to an embodiment. Referring collectively to FIGS. 1 and 2, reflector assembly 112 includes a first reflective surface 118 positioned within interior volume 106. First reflective surface 118 is positioned between lamp 108 and wireless antenna 110. First reflective surface 118 is configured to redirect the wireless signals transmitted to or from wireless antenna 110 toward the ground surface. In some embodiments, first reflective surface 118 is conical, for example, a continuous conical surface as best seen in FIG. 2. As shown in FIG. 1, first reflective surface 118 is configured to redirect the wireless signals transmitted from wireless antenna 110 from initially upward orientation to downward orientations along different directions 124 and 126 pointed to a desired area, for example, the ground surface, where end-user computational devices are located. First reflective surface 118 can be made of a metal, for example, silver, aluminum, copper, or any other suitable metal, or any other suitable reflective material.

In some embodiments, first reflective surface 118 has any other suitable non-conical shape for redirecting wireless signals, for example, a concave or convex shape. In some embodiments, reflector assembly 112 includes two or more reflective discontinuous surfaces configured to redirect the wireless signals transmitted to or from wireless antenna 110 in directions toward the ground surface.

Reflector assembly 112 can also include one or more reflective surfaces configured to redirect light rays emitted from lamp 108. For example, referring collectively to FIGS. 1 and 2, reflector assembly 112 includes a second reflective surface 114 and a third reflective surface 116 positioned within the interior volume. Second and third reflective surfaces 114 and 116 are positioned between lamp 108 and wireless antenna 110. Second and third reflective surfaces 114 and 116 are also positioned between lamp 108 and first reflective surface 118. Second and third reflective surfaces 114 and 116 are configured to redirect light rays emitted from lamp 108 outward and/or downward from luminaire 100 toward the ground surface.

In some embodiments, second and third reflective surfaces 114 and 116 are planar. In some embodiments as shown in FIGS. 1 and 2, second reflective surface 114 and third reflective surface 116 form a V shape. In such V-shape embodiments, second reflective surface 114 and third reflective surface 116 are each angled downward toward the ground from an inner side to an outer side as shown in FIGS. 1 and 2. In some V-shape embodiments, the apex of the V is aligned with a center of lamp 108 and a center of conical reflective surface 118 along longitudinal axis 103 of luminaire 100. And in some embodiments, lamp 108, first reflective surface 118, second reflective surface 114, and third reflective surface 116 are coaxial with wireless antenna 110 along axis 103 as shown in FIG. 1. Second and third reflective surfaces 114 and 116 can be made of a metal, for example, silver, aluminum, copper, or any other suitable metal, or any other suitable reflective material. In some embodiments, second reflective surface 114 and third reflective surface 116 have non-planar shapes for redirecting light rays emitted from lamp 108, for example, a concave or convex shape. In some embodiments, reflector assembly 112 includes only one surface configured to redirect light rays from lamp 108, for example, a conical reflective surface.

In some embodiments, reflector assembly 112, including first, second, and third reflective surfaces 118, 114, and 116, is coupled to second side 107 of housing 104, which is the same side to which lamp 108 is coupled. Referring to FIG. 2, in some embodiments, reflector assembly 112 includes a mounting bracket 134 that is coupled to second side 107 of housing 104. Mounting bracket 134 includes spaced apart first and second arms 136 and 138 coupled to second side 107 of housing 104, and an extending portion 140 spanning between arms 136 and 138. In some embodiments, second and third reflective surfaces 114 and 116 are coupled to extending portion 140 such that the apex of the V formed by second and third reflective surfaces 114 and 116 is between extending portion 140 and lamp 108. The gap between first and second arms 136 and 138 is sized to receive second and third reflective surfaces 114 and 116 there between.

Housing mounting bracket 134 can also include a third arm 142 coupled to extending portion 140 at one end of the third arm 142. At the other end of third arm 142, first reflective surface 118 is coupled to third arm 142. In some embodiments, first reflective surface 118 is coupled to third arm 142 such that first reflective surface 118 is positioned between the prongs of the V formed by second and third reflective surfaces 114 and 116 as best seen in FIG. 2.

Figure 3:
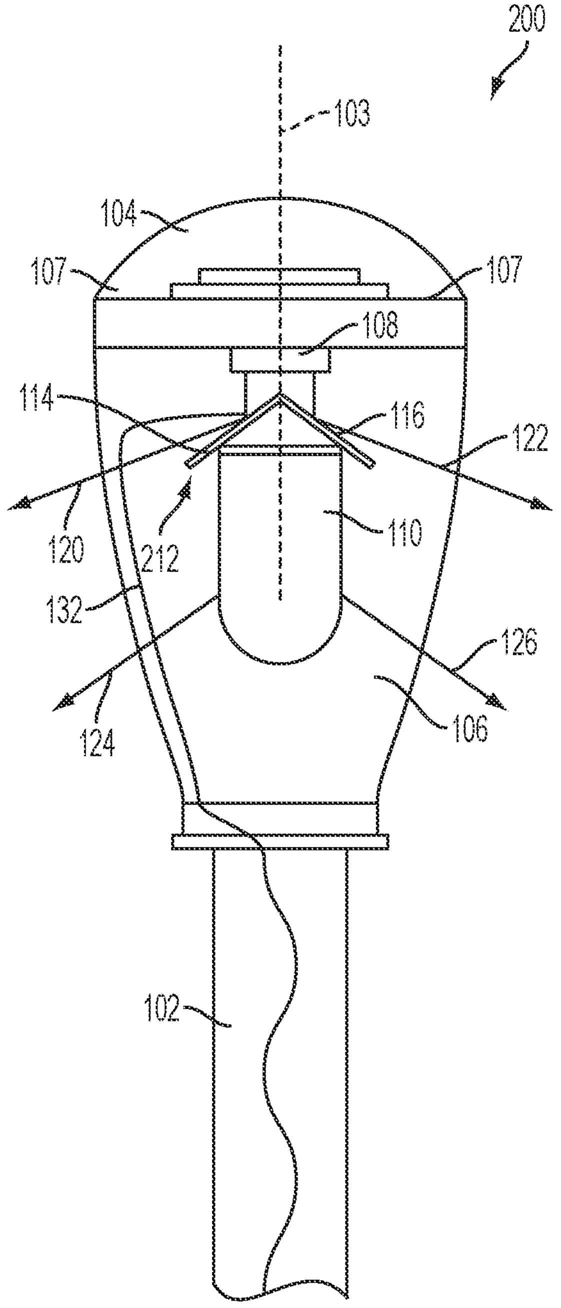
FIG. 3 illustrates a side view of a luminaire according to another embodiment.

In some embodiments, wireless antenna 110 is coupled to the same side of housing 104 as lamp 108. FIG. 3 illustrates a luminaire 200 according to one such embodiment. To the extent luminaire 200 shares similar features as described above regarding FIGS. 1 and 2, similar reference numbers are used. As seen in FIG. 3, wireless antenna 110 is coupled to second side 107 of housing 104, which is the same side to which lamp 108 is coupled. In some embodiments in which wireless antenna 110 is coupled to second side 107, a reflector assembly 212 does not include a reflective surface (for example, first reflective surface 118 shown in FIGS. 1 and 2) configured to redirect wireless signals transmitted to and from antenna 110. Instead, wireless antenna 110 is positioned within interior volume 106 such that antenna 110 can receive or transmit wireless signals along first and second directions 124 and 126 that are directed downward towards the ground surface without being redirected.

In some embodiments, a luminaire includes more than one wireless antenna. For example, the luminaire can include two, three, four, or more than four wireless antennas. FIGS. 4-7 illustrate two embodiments in which luminaires 300 and 400 include more than one wireless antenna. To the extent luminaires 300 and 400 share similar features as described above regarding FIGS. 1-3, similar reference numbers are used.

Figure 4:
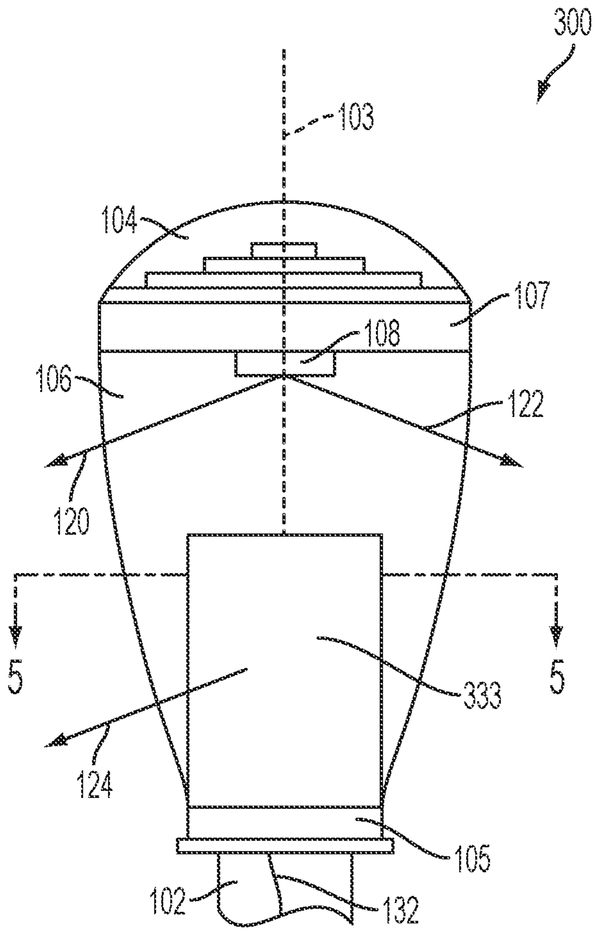
FIG. 4 illustrates a side view of a luminaire according to yet another embodiment.
Figure 5:
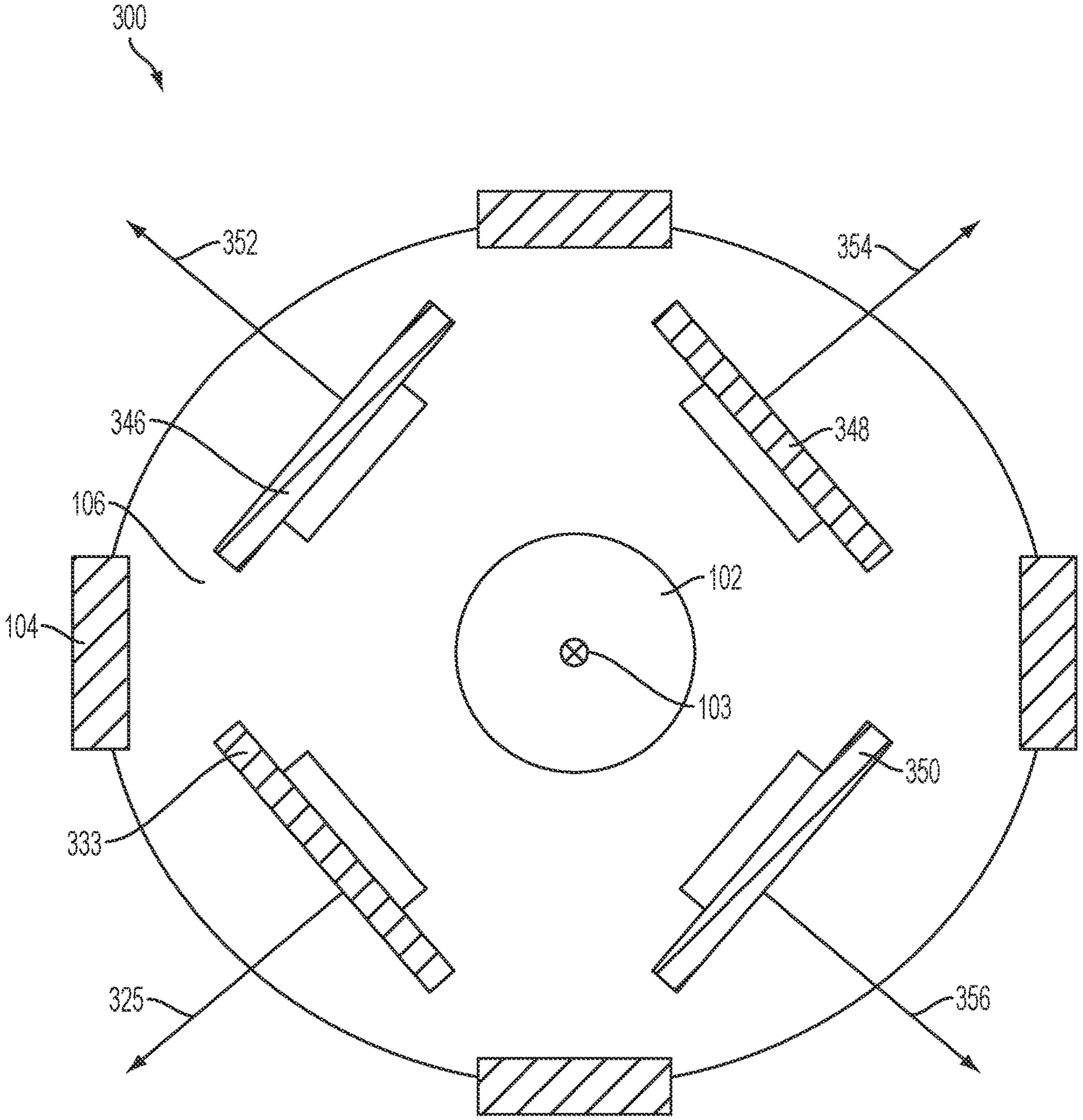
FIG. 5 illustrates a cross-sectional view of the luminaire of FIG. 4 taken along line 5-5 in FIG. 4.

Referring collectively to FIGS. 4 and 5, in some embodiments, luminaire 300 includes four antennas 333, 346, 348 and 350 positioned within interior volume 106. Antennas 333, 346, 348 and 350 can be directional antennas (as shown in FIGS. 3 and 4), omnidirectional antennas, or dipole antennas. In embodiments in which antennas 333, 346, 348, and 350 are directional antennas, antennas 333, 346, 348, and 350 can be positioned such that each antenna 333, 346, 348, and 350 can receive or transmit wireless signals along at least first, second, third, and fourth directions 325, 352, 354, and 356 that are radially outward and/or downward toward the ground. Each direction 325, 352, 354, and 356 is different than the other directions. In some embodiments, antennas 333, 346, 348, and 350 are equally spaced around axis 103 of luminaire 300. In some embodiments, antennas 333, 346, 348, and 350 are coupled to first side 105, which is opposite from second side 107 to which lamp 108 is coupled. In some embodiments (not shown), antennas 333, 346, 348, and 350 are coupled to top side 107, which is the same side to which lamp 108 is coupled.

In some embodiments, antennas 333, 346, 348 and 350 are positioned entirely within interior volume 106 to conceal antennas 333, 346, 348 and 350 from the view of people in the vicinity of the luminaire without compromising the functionality of antennas 333, 346, 348 and 350.

In other embodiments, antennas 333, 346, 348 and 350 are positioned partially within interior volume 106.

Figure 6:
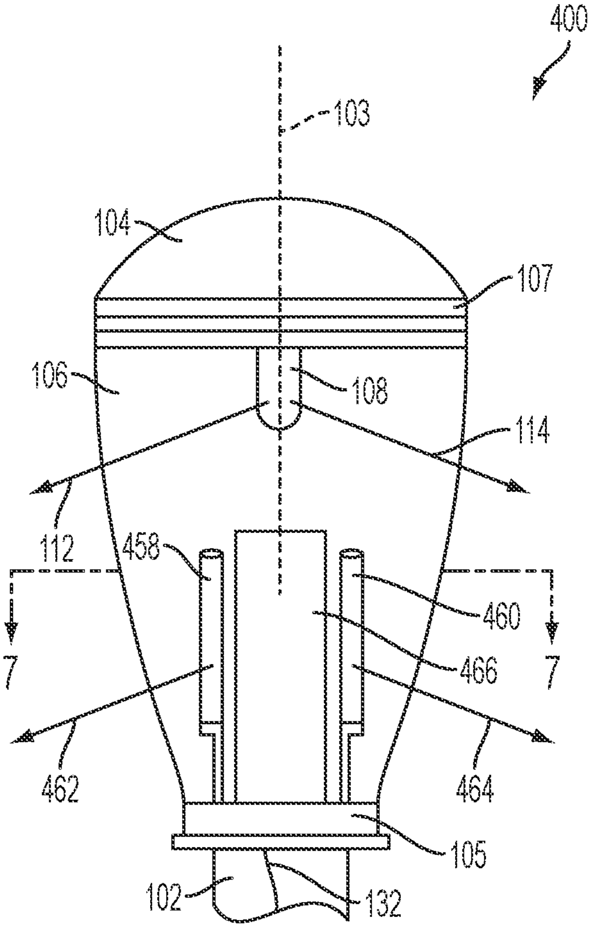
FIG. 6 illustrates a side view of a luminaire according to an embodiment.
Figure 7:
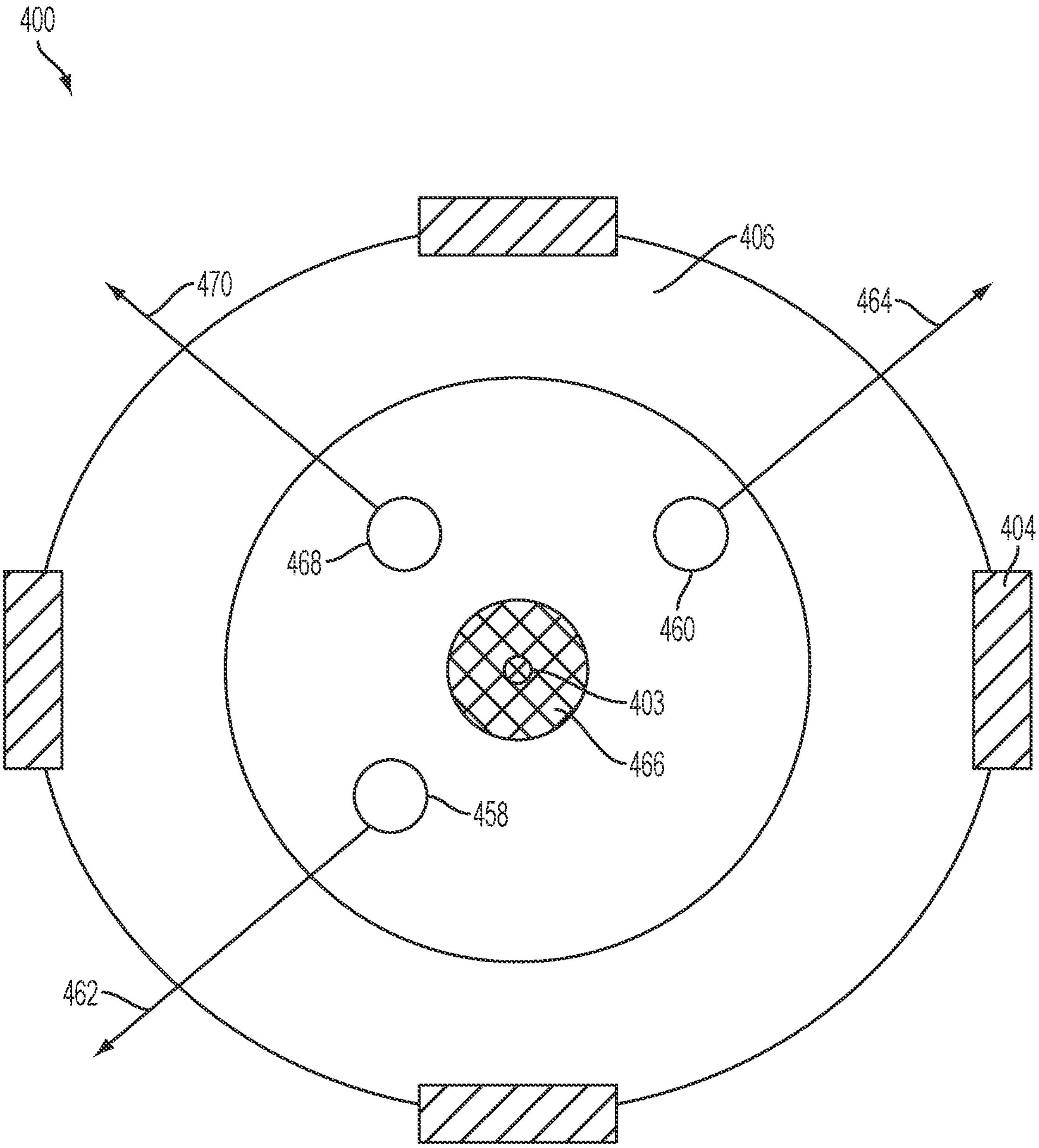
FIG. 7 illustrates a cross-sectional view of the luminaire of FIG. 6 taken along line 7-7 in FIG. 6.

Referring collectively to FIGS. 5 and 6, in some embodiments, luminaire 400 includes three antennas 458, 468, and 460 positioned within interior volume 106. Antennas 458, 468, and 460 can be directional antennas, omnidirectional antennas (as shown in FIGS. 5 and 6), or dipole antennas. In embodiments in which antennas 458, 468, and 460 are omnidirectional antennas, antennas 458, 468, and 460 can be positioned such that each antenna 458, 468, and 460 can receive or transmit wireless signals along at least first, second, and third directions 462, 464, and 470 that are radially outward and/or downward toward the ground. Each direction 462, 464, and 470 is different than the other directions. In some embodiments, antennas 458, 468, and 460 are equally spaced around axis 103 of luminaire 400. In some embodiments, antennas 458, 468, and 460 are coupled to first side 105, which is opposite from second side 107 to which lamp 108 is coupled. In some embodiments (not shown), antennas 458, 468, and 460 are coupled to top side 107, which is the same side to which lamp 108 is coupled.

In some embodiments, antennas 458, 468, and 460 are positioned entirely within interior volume 106 to conceal antennas 458, 468, and 460 from the view of people in the vicinity of the luminaire without compromising the functionality of antennas 458, 468, and 460.

In other embodiments, antennas 458, 468, and 460 are positioned partially within interior volume 106.

In some embodiments, luminaire 400 includes a reflector 466 configured to shield each antennas 458, 468, and 460 from wireless signals transmitted to or from each other. In some embodiments, reflector 466 is cylindrical and positioned along axis 103 of luminaire 400. In other embodiments, reflector 466 has any other suitable non-cylindrical shape or configuration.

Figure 8:
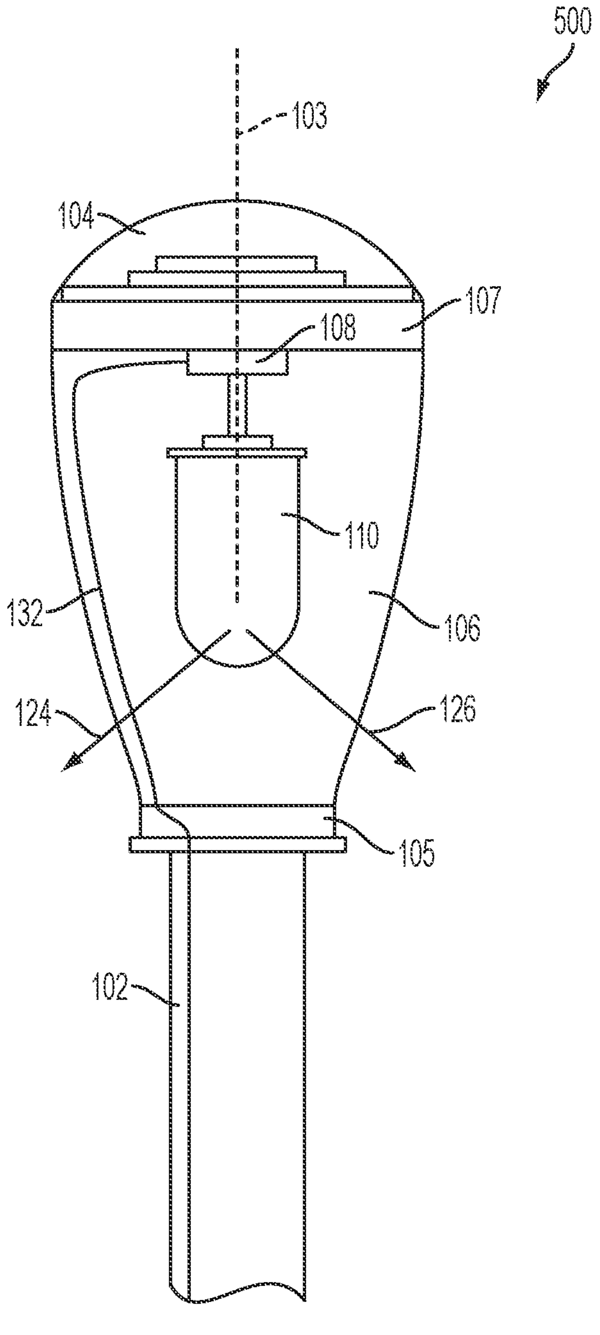
FIG. 8 illustrates a side view of a luminaire according to another embodiment.
Figure 9:
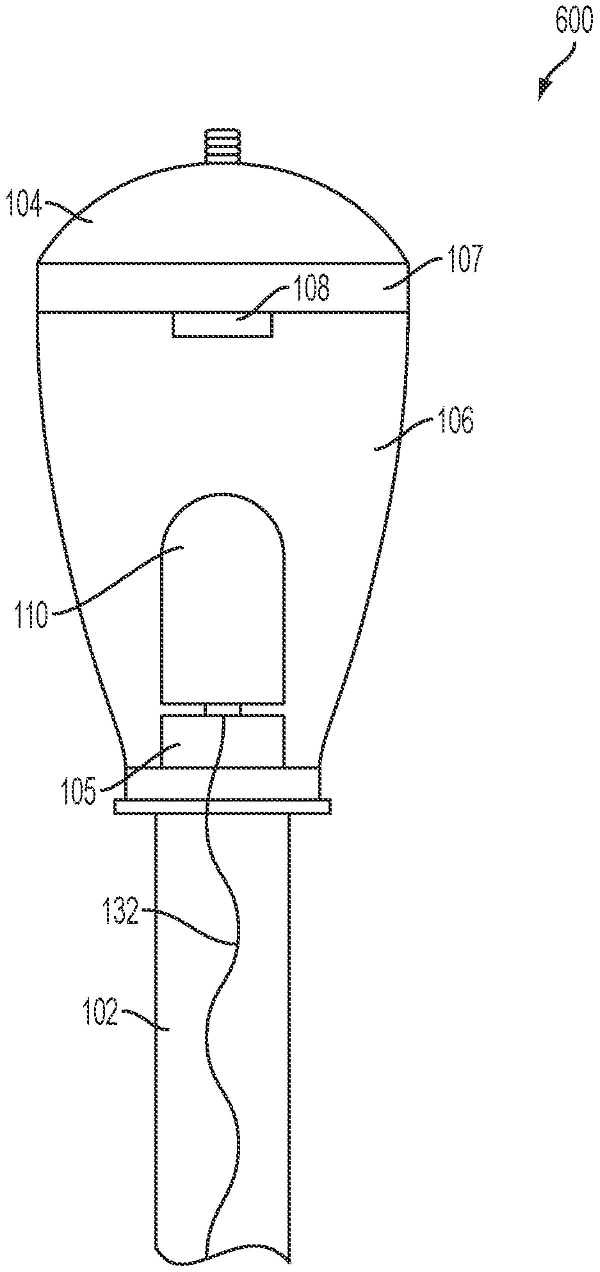
FIG. 9 illustrates a side view of a luminaire according to yet another embodiment.

In some embodiments, a luminaire does not include a reflector assembly. FIGS. 8 and 9 illustrate two embodiments in which luminaires 500 and 600 do not include a reflector assembly. To the extent luminaires 500 and 600 share similar features as described above regarding FIGS. 1-7, similar reference numbers are used. Referencing FIG. 8, in some embodiments in which luminaire 500 does not include a reflector assembly, wireless antenna 110 is coupled to top side 107, which is the same side to which lamp 108 is coupled. Referencing FIG. 9, wireless antenna 110 is coupled to first side 105, which is opposite second side 107 to which lamp 108 is coupled.

In some embodiments, the wireless antenna(s) in any one of the above described embodiments are configured to be operatively coupled to an access point positioned outside interior volume 106 defined by housing 104. FIG. 10 illustrates one such embodiment. Luminaire 700 includes a wireless antenna 776 that is configured to be operatively coupled to an access point 774 that is positioned in an enclosure 772 on the ground. In some embodiments, enclosure 772 is buried underground to further conceal access point 774 and to further improve aesthetics of the surrounding area. Wireless antenna 776 is operatively coupled to access point 774 using one or more cables 132 (not shown in FIG. 10) that run from housing 104 of luminaire 700 to access point 774. For example, one more cables 132 can run from housing 104, through post 102, through a conduit or passage in the ground, and into enclosure 772.

In some embodiments (not shown), the wireless antenna (s) in any one of the above described embodiments are configured to be operatively coupled to an access point positioned inside interior volume 106, for example, an access point mounted to either first or second sides 105 and 107.

In some embodiments, lamp 108 is configured to be electrically coupled to a power source outside housing 104. For example, in some embodiments, lamp 108 is configured to be electrically coupled to a power inserter that powers access point 774. For example, the power inserter can be a modified Antronix power inserter that strips power from an 89V cable plant.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

What is claimed is:

1. A luminaire comprising:

a housing defining an interior volume of the luminaire;

a lamp within the interior volume and configured to emit light;

a first wireless antenna positioned within the interior volume, configured to transmit or receive a wireless signal along a first direction, and configured to be operatively coupled to an access point through a communication link separate from the wireless signal that the first wireless antenna transmits or receives, wherein the access point is positioned outside the interior volume in an enclosure on ground; and a first reflective surface positioned within the interior volume and configured to redirect a first light ray emitted from the lamp toward the ground.

2. The luminaire of claim 1, wherein the first wireless antenna is coupled to a same side of the housing as the lamp.

3. The luminaire of claim 1, wherein the first wireless antenna is positioned entirely within the interior volume and the wireless signal is directed toward the ground.

4. The luminaire of claim 1, further comprising a second reflective surface positioned within the interior volume and configured to redirect a second light ray emitted from the lamp in a second direction different than the first light ray.

5. The luminaire of claim 4, wherein the first reflective surface and the second reflective surface form a V shape.

6. The luminaire of claim 1, wherein the first wireless antenna is a directional antenna.

7. The luminaire of claim 1, wherein the first wireless antenna is an omnidirectional antenna.

8. The luminaire of claim 1, wherein the first wireless antenna is a dipole antenna.

9. The luminaire of claim 1, wherein the lamp is an LED lamp.

10. The luminaire of claim 9, wherein the LED lamp is configured to be electrically coupled to a power inserter that powers the access point.

11. The luminaire of claim 1, wherein the luminaire is configured for outdoor roadway or street lighting, outdoor area or pathway lighting, outdoor flood lighting, or outdoor tunnel lighting.

12. The luminaire of claim 1, wherein the first wireless antenna is configured to transmit the wireless signal to an end-user computational device or receive the wireless signal from the end-user computational device.

13. The luminaire of claim 12, wherein the access point is configured to couple the end-user computational device to a network.

14. A luminaire comprising:

a housing defining an interior volume of the luminaire;

a lamp within the interior volume and configured to emit light, wherein a first wireless antenna is coupled to a same side of the housing as the lamp; and the first wireless antenna positioned within the interior volume, configured to transmit a wireless signal along a first direction, and configured to be operatively coupled to an access point through a communication link separate from the wireless signal that the first wireless antenna transmits or receives, wherein the first direction is towards ground, and wherein the access point is positioned outside the interior volume in an enclosure on the ground.

15. The luminaire of claim 14, wherein the first wireless antenna is configured to transmit the wireless signal to an end-user computational device or receive the wireless signal from the end-user computational device.

16. The luminaire of claim 14, wherein the first wireless antenna is coupled to a same side of the housing as the lamp.

17. The luminaire of claim 14, wherein the first wireless antenna is positioned entirely within the interior volume and the wireless signal is directed toward the ground.

18. The luminaire of claim 14, wherein the first wireless antenna is a directional antenna.

19. The luminaire of claim 14, wherein the first wireless antenna is an omnidirectional antenna.

20. The luminaire of claim 14, wherein the first wireless antenna is a dipole antenna.

* * * * *